(No Model.)
H. C. SPALDING.
ELECTRICAL CIRCUIT.
No. 327,496. Patented Sept. 29, 1885.
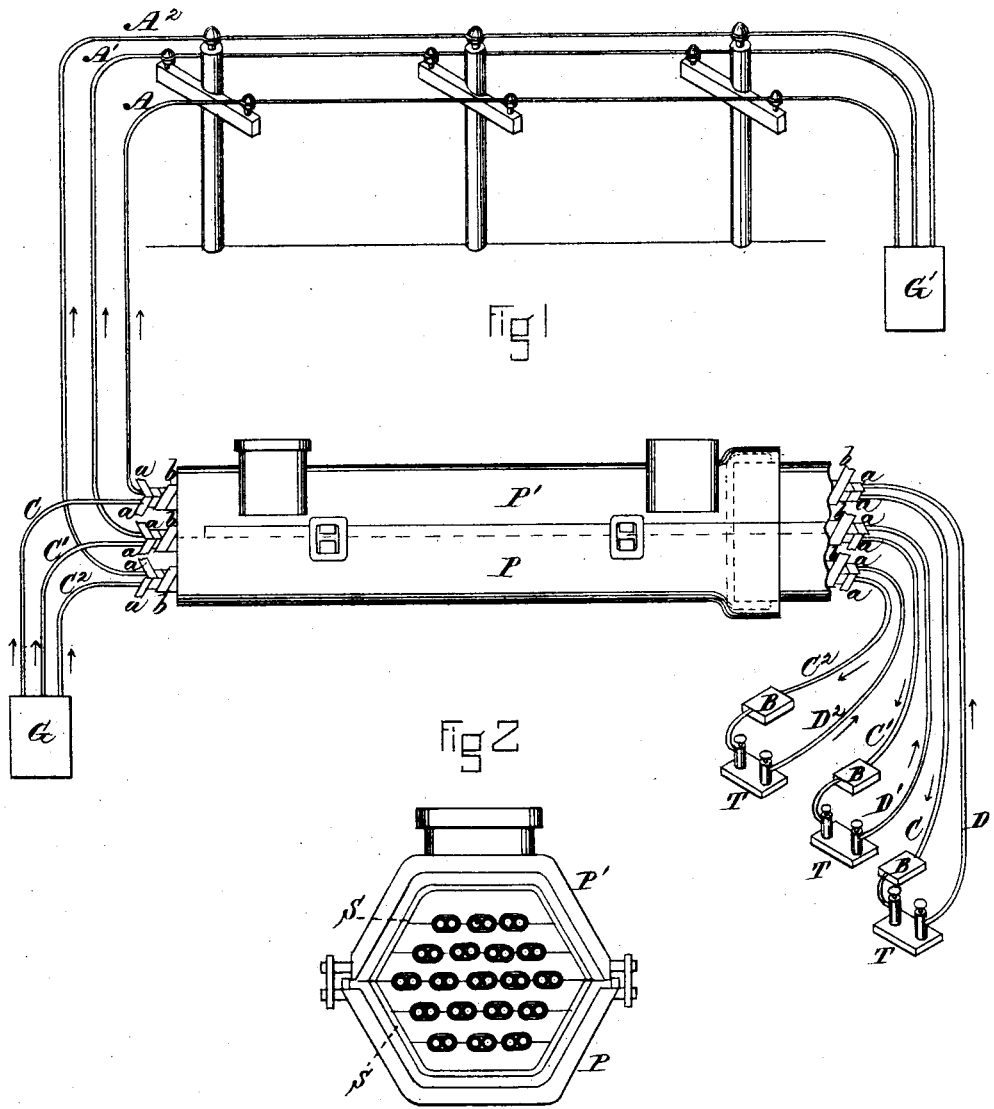
WITNESSES
W. Frisby
W. H. Doggett
INVENTOR
Henry C. Spalding
By Parker W. Page
atty.

UNITED STATES PATENT OFFICE.

HENRY C. SPALDING, OF BOSTON, MASSACHUSETTS.

ELECTRICAL CIRCUIT.

SPECIFICATION forming part of Letters Patent No. 327,496, dated September 29, 1885.

Application filed April 12, 1884. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Electrical Circuits, of which the following is a specification, reference being had to the drawings accompanying and forming a part of the same.

In another application filed by me—viz., No. 112,206—I have shown and described a means of protecting against induction and static influences circuits which are partly aerial and partly inclosed in underground or similar conduits, the plan referred to being to double upon itself that portion of the circuit contained in the conduit and grounding the return-wire at the end of the conduit and inclosing both in an insulated metallic sheath or screen.

The object of my present invention is to more perfectly protect the circuit or circuits when a number are run through the same conduit from induction and the earth's influence, and for this purpose I combine with each aerial line a two-wire metallic underground circuit, grounded as before, and inclosed or surrounded by an insulated metal screen, and around these I place a second insulated metal screen. For the aerial lines I use any of the known forms of conductor and support, and for the protected portion I employ the conduit invented by me and described in an application filed by me November 24, 1883, No. 112,748. I will now describe the system by reference to the drawings.

Figure 1 is a diagram of the circuits and the devices employed therewith for protecting and insulating the same. Fig. 2 is a sectional view of the conduit.

The letters A A' A² designate the wires of an arbitrary number of telegraph or telephone lines. At either end of the circuits to which these lines belong let it be assumed that the necessity arises for running the wires for a greater or less distance underground, as would be the case when the terminus of the circuit is in a large or crowded city. Then for the underground portion I use a conduit which I prefer to build of the sections P P, of a molded plastic material, containing sectional rests or blocks of bituminous material. By means of these rests, placed preferably at short intervals, I support a number of cables, each composed of two wires insulated from each other and inclosed in a metallic sheath or screen, and between the group of cables and the conduit-sections I insert a metal screen, S, which may be composed of thin plates of iron, copper, or other metal. The interior spaces of the conduit may then be filled in with a plastic insulating material.

C C' C² and D D' D² designate the wires of the cables; $a$ $a$, the spirally-wound strips of paraffined paper by which they are insulated, and $b$ $b$ the spirally-wound strips of metallic foil which form the screens. To one wire of each cable, as D, D', or D², a line-wire, A, A', or A², is connected at the end of the conduit. At the same end the other wire, as C, C', or C², of each cable is grounded at G. The wires of the cables are then connected with the batteries B and translating devices T in the manner indicated, and the aerial lines grounded at G'. By this means the lines or circuits are very perfectly protected from all inductive disturbances, both such as are due to induction from neighboring wires and from the earth's influence.

It is obvious that the underground portion of the line may be needed at either or both ends of the circuit. The arrangement of circuits is, however, similar in all cases, the object being to ground both ends of the lines at or beyond the same end of the conduit, and to inclose the two wire portions of the circuit by two insulated metallic sheaths or screens.

I do not confine myself to any special form of conduit nor plan of insulation; nor do I claim the conduit shown apart from the system with which it is here combined; but

What I claim is—

1. The combination, with an aerial line, of a two-wire or metallic circuit, underground cable, and two insulated metallic sheaths or screens surrounding the same, substantially as set forth.

2. The combination, with a series of aerial lines, of two wire or metallic circuit underground cables connected therewith, metallic sheathings or screens surrounding each cable, and an insulated metallic screen inclosing all of the cables, substantially as set forth.

In testimony whereof I have hereunto set my hand this 10th day of April, 1884.

HENRY C. SPALDING.

Witnesses:
  JAMES W. FOSTER,
  AUGUSTINE L. BABBIDGE.